(12) United States Patent
Nukada et al.

(10) Patent No.: US 12,095,325 B2
(45) Date of Patent: Sep. 17, 2024

(54) STATOR AND MOTOR USING SAME

(71) Applicant: PANASONIC INTELLECTUAL PROPERTY MANAGEMENT CO., LTD., Osaka (JP)

(72) Inventors: Keiichiro Nukada, Nara (JP); Toshiyuki Tamamura, Osaka (JP); Yuya Maeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 708 days.

(21) Appl. No.: 17/273,223

(22) PCT Filed: Sep. 3, 2019

(86) PCT No.: PCT/JP2019/034631
§ 371 (c)(1),
(2) Date: Mar. 3, 2021

(87) PCT Pub. No.: WO2020/071035
PCT Pub. Date: Apr. 9, 2020

(65) Prior Publication Data
US 2021/0359566 A1 Nov. 18, 2021

(30) Foreign Application Priority Data
Oct. 2, 2018 (JP) ................. 2018-187195

(51) Int. Cl.
*H02K 3/28* (2006.01)
*H02K 1/14* (2006.01)
(Continued)

(52) U.S. Cl.
CPC ............... *H02K 3/28* (2013.01); *H02K 1/146* (2013.01); *H02K 1/165* (2013.01); *H02K 3/12* (2013.01);
(Continued)

(58) Field of Classification Search
CPC .. H02K 3/28; H02K 3/12; H02K 3/18; H02K 3/48; H02K 3/522; H02K 1/146; H02K 1/165; H02K 3/552; H02K 3/32
See application file for complete search history.

(56) References Cited

U.S. PATENT DOCUMENTS

2005/0108870 A1* 5/2005 Harada ............... H02K 15/0414
29/606
2016/0248303 A1* 8/2016 Kiyokami ................ H02K 9/19
(Continued)

FOREIGN PATENT DOCUMENTS

DE 102012212637 A1 1/2014
EP 2 017 854 A1 1/2009
(Continued)

OTHER PUBLICATIONS

Royama (JP 2005019618 A) English Translation (Year: 2005).*
(Continued)

*Primary Examiner* — Tulsidas C Patel
*Assistant Examiner* — Robert E Mates
(74) *Attorney, Agent, or Firm* — Rimon P.C.

(57) ABSTRACT

A stator includes a yoke, teeth connected to the yoke, and coils including plate-shaped conductive wire and mounted on respective teeth. Each coil includes a wound part, a first and second terminals. The wound part is wound around the tooth n turns (n is an integer equal to or greater than 2). The wound part satisfies a relationship represented by Ak<Bk, where Ak is a height of a first section in an axial direction of the tooth, and Bk is a width of a second section in a circumferential direction of the tooth. The first and second sections are sections in k-th turn (k is an integer that satisfies 1≤k≤n) of the coil. The first section is along an axial end
(Continued)

surface of the tooth. The second section extends from an end of the first section along a circumferential end surface of the tooth.

4 Claims, 9 Drawing Sheets

(51) Int. Cl.
    *H02K 1/16*     (2006.01)
    *H02K 3/12*     (2006.01)
    *H02K 3/18*     (2006.01)
    *H02K 3/48*     (2006.01)
    *H02K 3/52*     (2006.01)

(52) U.S. Cl.
    CPC ................ *H02K 3/18* (2013.01); *H02K 3/48* (2013.01); *H02K 3/522* (2013.01)

(56) References Cited

U.S. PATENT DOCUMENTS

| | | | |
|---|---|---|---|
| 2016/0254718 A1 | 9/2016 | Watanabe et al. | |
| 2018/0041087 A1* | 2/2018 | Hayashizaka | H02K 21/16 |

FOREIGN PATENT DOCUMENTS

| | | | | |
|---|---|---|---|---|
| EP | 3 258 574 A1 | | 12/2017 | |
| JP | 11150899 A | * | 6/1999 | |
| JP | 2005019618 A | * | 1/2005 | |
| JP | 2005-160143 A | | 6/2005 | |
| JP | 2008-136317 A | | 6/2008 | |
| JP | 2013-158177 A | | 8/2013 | |
| JP | 2016-165208 A | | 9/2016 | |
| JP | 6092862 B2 | | 3/2017 | |
| WO | WO-2013187501 A1 | * | 12/2013 | ............... H01F 5/02 |

OTHER PUBLICATIONS

Hongo (WO 2013187501 A1) English Translation (Year: 2013).*
Shimaya (JP 11150899 A) English Translation (Year: 1999).*
International Search and Written Opinion issued in International Patent Application No. PCT/JP2019/034631, dated Dec. 3, 2019; with partial English translation.
Extended European Search Report issued in counterpart European Patent Application No. 19869430.9, dated Oct. 24, 2021.

* cited by examiner

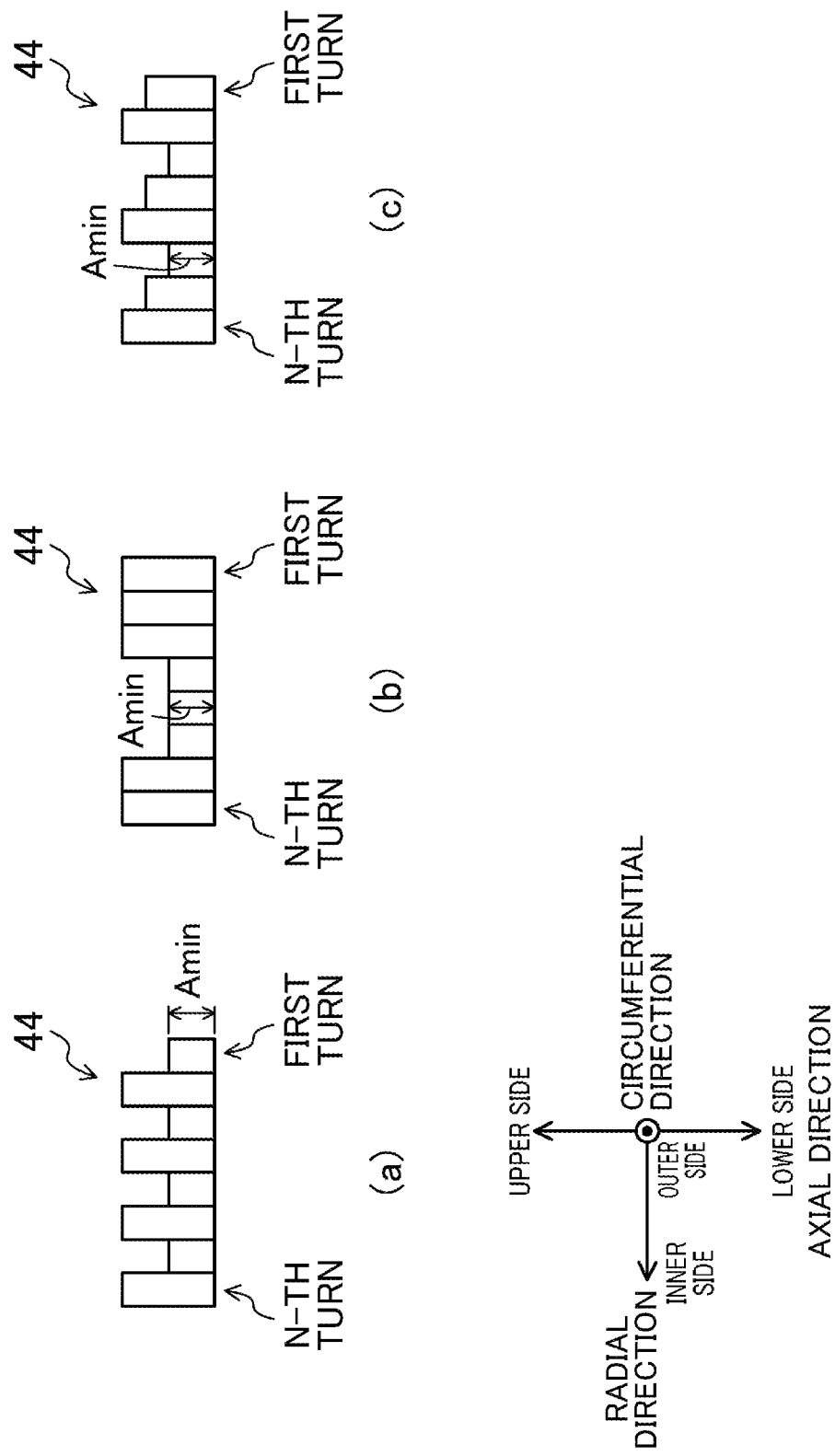

STATOR AND MOTOR USING SAME

CROSS-REFERENCE OF RELATED APPLICATIONS

This application is the U.S. National Phase under 35 U.S.C. § 371 of International Patent Application No. PCT/JP2019/034631, filed on Sep. 3, 2019, which in turn claims the benefit of Japanese Application No. 2018-187195, filed on Oct. 2, 2018, the entire disclosures of which Applications are incorporated by reference herein.

TECHNICAL FIELD

The present invention relates to a stator and a motor including the same.

BACKGROUND ART

In recent years, there is an increasing demand for motors for industrial and in-vehicle applications. Under the circumstances, downsizing of motors and an increase in the efficiency of motors are increasingly desired.

As a technique of improving the efficiency of a motor while reducing the volume of the motor, an increase in the space factor of coils disposed in slots of a stator is known. The increase in the space factor of the coils reduces losses caused by a current flowing through the coils when driving the motor.

Placement of cast coils made of a copper material in slots has been suggested (see e.g., Patent Document 1) as a technique of increasing the space factor of the coils. In this configuration, the coils have a quadrangular cross section and a large diameter to increase the space factor.

CITATION LIST

Patent Documents

[Patent Document 1] German Patent Application Publication No. 102012212637

SUMMARY OF THE INVENTION

Technical Problem

In recent years, the number of motors used in vehicles, industrial equipment, and the like has been increasing, and further downsizing of individual motors is desired.

However, in the conventional configuration disclosed in Patent Document 1, the coils have an increased diameter in order to increase the space factor of the coils. Consequently, axial ends of each coil, which specifically are portions protruding out of the corresponding slot in a direction along an output shaft of the motor (hereinafter, referred to as coil ends), also have an increased height, making it difficult to sufficiently reduce the size of the coil and the size of the resulting motor.

In view of the foregoing, it is an object of the present invention to provide a stator in which coil ends have a reduced height and a motor including the stator.

Solution to the Problem

In order to achieve the object, a stator of the present invention at least includes: an annular yoke; teeth connected to the yoke; and coils including plate-shaped conductive wire and mounted on the respective teeth. Each of the coils includes a first terminal, a wound part electrically connected to the first terminal, and a second terminal located closer to a distal end of the corresponding tooth than the first terminal and electrically connected to the wound part. The wound part is wound around the tooth by n turns (n is an integer equal to or greater than 2). The wound part satisfies a relationship represented by Ak<Bk, where Ak is a height of a first section in an axial direction of the tooth, and Bk is a width of a second section in a circumferential direction of the tooth. The first and second sections are sections in a k-th turn (k is an integer that satisfies $1 \leq k \leq n$) of the coil. The first section is along an axial end surface of the tooth. The second section is located adjacent to the first section in a direction from the first terminal toward the second terminal and the second section extends from an end of the first section along a circumferential end surface of the tooth.

This configuration allows the first sections, which correspond to coil ends, to have a reduced height in the axial direction, achieving downsizing of the stator. This configuration also keeps the amount of heat dissipation from the coils from decreasing and maintains the heat dissipation performance of the stator.

A motor of the present invention at least includes: the above-described stator; and a rotor provided at a predetermined distance from the stator.

This configuration allows the stator to have a reduced height, achieving downsizing of the motor.

Advantages of the Invention

The stator of the present invention allows the coil ends to have a reduced height. The stator can therefore achieve downsizing thereof. The stator can also maintain its heat dissipation performance. The motor of the present invention includes the stator that has a reduced height. The motor can therefore achieve downsizing thereof.

BRIEF DESCRIPTION OF THE DRAWINGS

FIG. 5 shows schematic views of cross sections of coil ends of a variation.

DESCRIPTION OF EMBODIMENTS

Embodiments of the present invention will be described in detail with reference to the drawings. The following description of advantageous embodiments is a mere example in nature, and is not at all intended to limit the scope, applications or use of the present invention.

First Embodiment

Configuration of Motor

Figure 1:
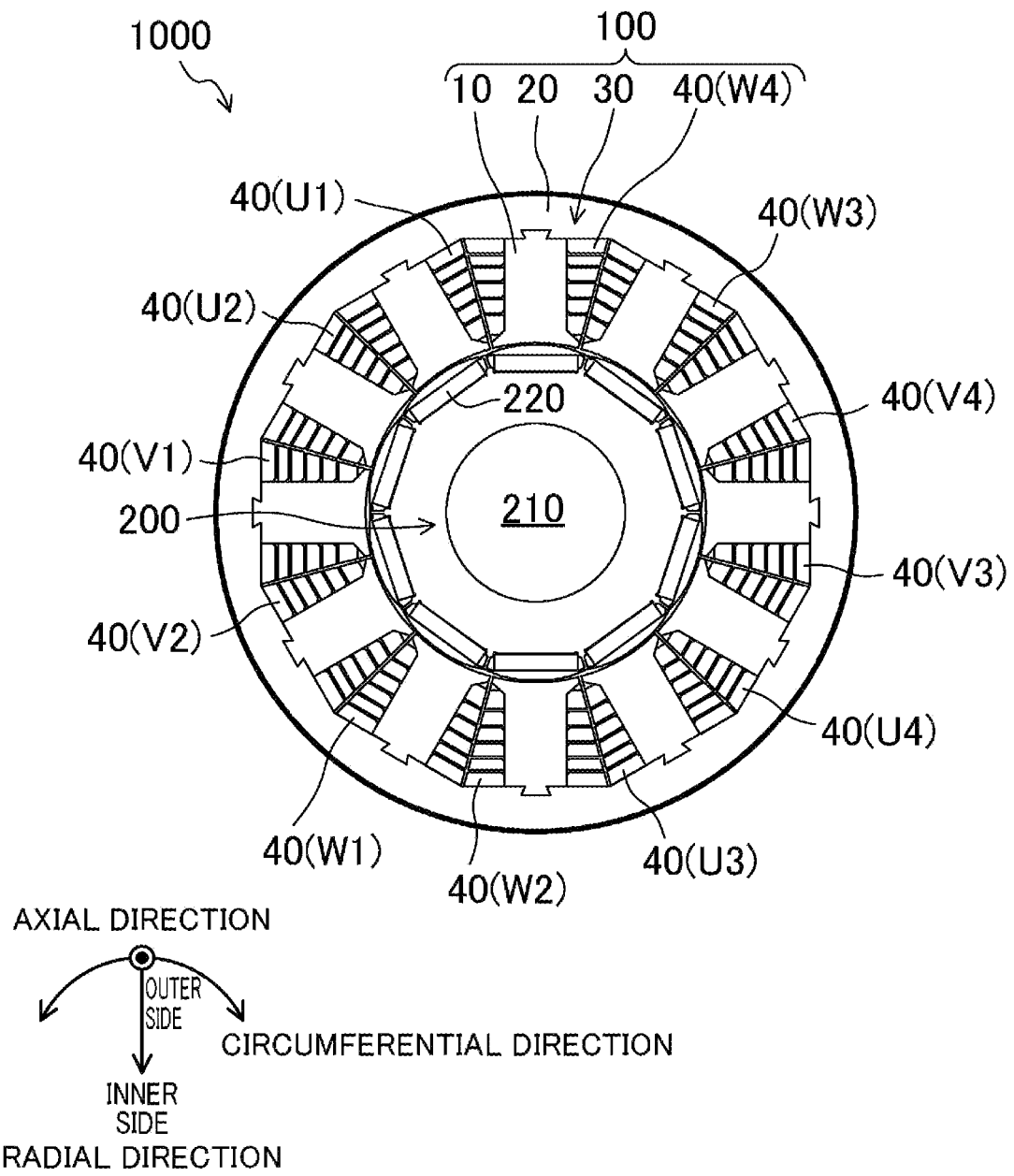
FIG. 1 is a cross-sectional view of a motor of a first embodiment of the present invention.

FIG. 1 is a cross-sectional view of a motor of this embodiment. In the following description, the directions along the radius and circumference of a motor 1000 may be referred to as a "radial direction" and a "circumferential direction", respectively. The direction (i.e., the direction perpendicular to the drawing plane of FIG. 1) in which an output shaft 210 of the motor 1000 extends may be referred to as an "axial direction". In the radial direction, the region around the center of the motor 1000 may be referred to as a "radially inner side", whereas the circumferential region of the motor may be referred to as a "radially outer side".

The motor 1000 includes a stator 100 and a rotor 200. While the motor 1000 also includes other components such as a motor case and bearings for pivotally supporting the output shaft, illustration and description thereof will be omitted for the sake of simplicity.

The stator 100 includes an annular yoke 20, teeth 10, slots 30, and coils 40. The teeth 10 are connected to the inner circumference of the yoke 20 and arranged at an equal interval along the inner circumference. Each slot 30 is located between a pair of the teeth 10 adjacent to each other in the circumferential direction. Each coil 40 is housed in one of the slots 30. The stator 100 is disposed on the radially outer side of the rotor 200 at a certain distance from the rotor 200.

Electromagnetic steel sheets containing silicon, for example, are stacked and punched into the teeth 10 and the yoke 20. Each coil 40 is a component including an n-turn winding (n is an integer equal to or greater than 2) of plate-shaped conductive wire made of a material such as copper and having a quadrangular cross section. Each coil 40 is mounted on a corresponding one of the teeth 10 with an insulator, not shown, therebetween and housed in a corresponding one of the slots 30. The coils in this embodiment may be referred to as coils U1 to U4, V1 to V4, or W1 to W4 in accordance with the phase of the current flowing through the coils 40. Furthermore, the coils 40 are wound around the respective teeth 10 by concentrated winding.

The rotor 200 includes the output shaft 210 disposed at the axial center of the rotor 200 and magnets 220 facing the stator 100 with N and S poles alternately arranged along the outer circumference of the output shaft 210. Materials, shapes, and material properties of the magnets 220 may be changed as appropriate depending on, for example, the power of the motor 1000.

The coils U1 to U4, V1 to V4, and W1 to W4 are connected in series. The current of three phases, i.e., U, V, and W phases with a phase difference in an electrical angle of 120° is supplied to the coils U1 to U4, V1 to V4, and W1 to W4 and excited. Accordingly, a rotating magnetic field occurs in the stator 100. The interaction of this rotating magnetic field with magnetic fields generated by the magnets 220 in the rotor 200 produces a torque on the rotor 200, causing the output shaft 210 to rotate while being supported by the bearing, not shown.

Configuration of Coil

Figure 2:
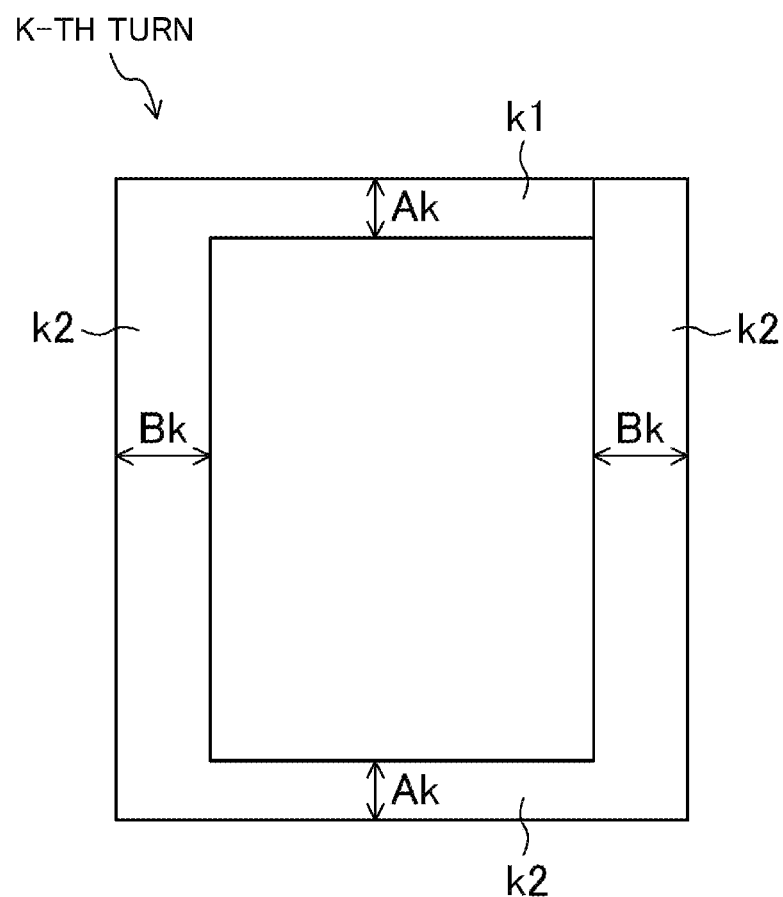
FIG. 2 is a schematic view of a k-th turn of a coil as viewed in a radial direction.
Figure 2:
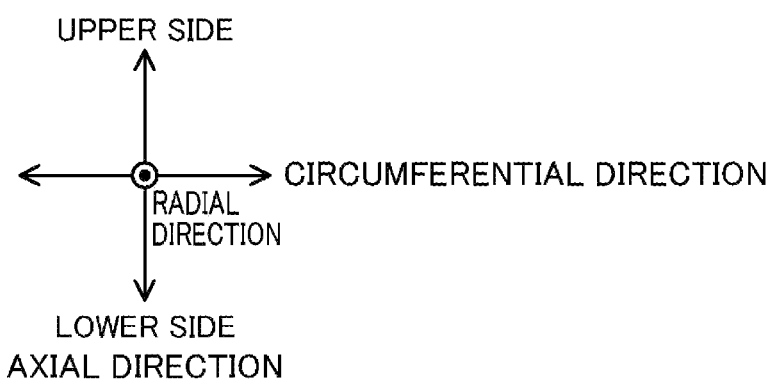
Figure 3A:
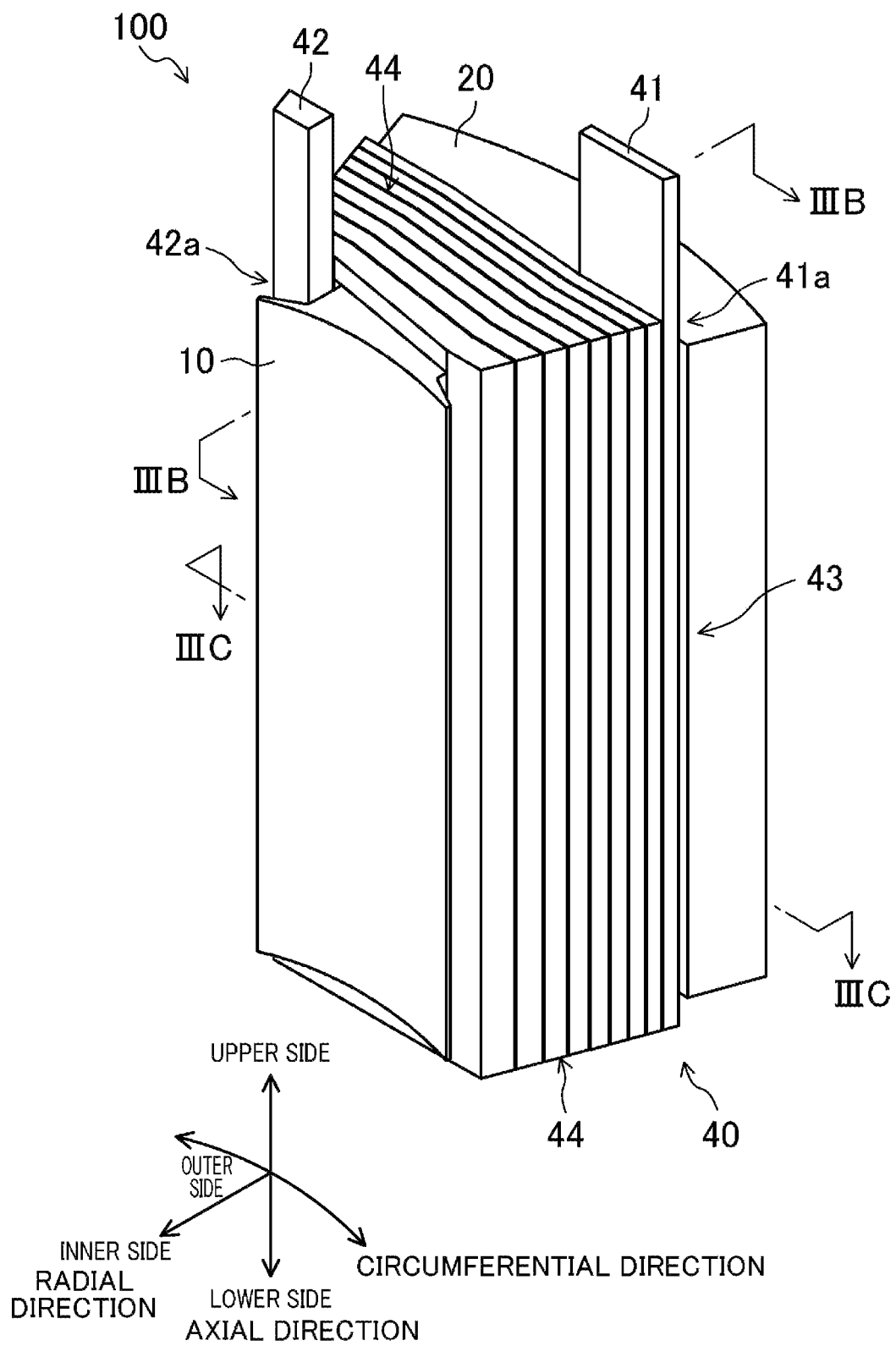
FIG. 3A is a perspective view of a coil wound around a tooth.
Figure 3B:
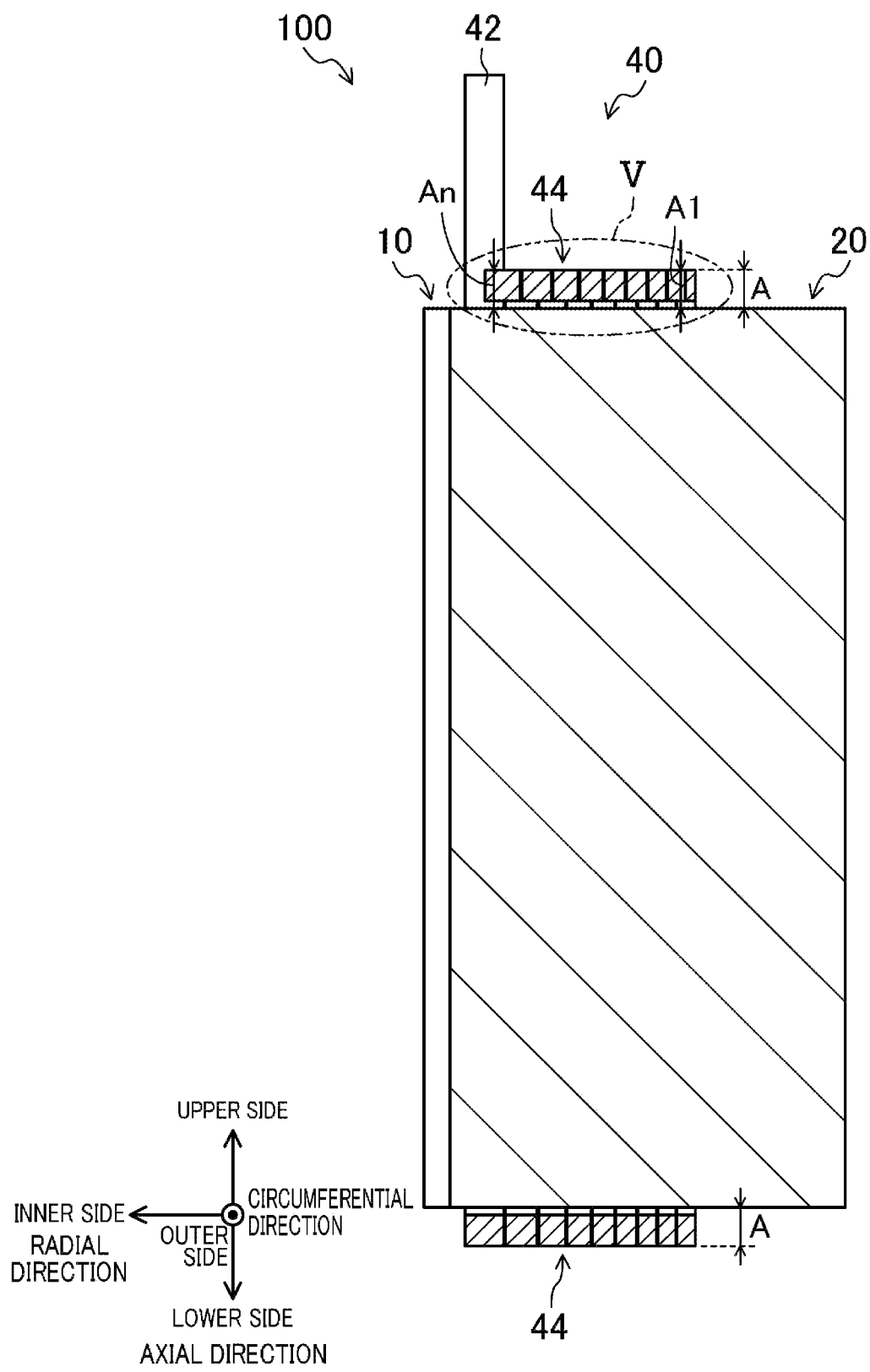
FIG. 3B is a cross-sectional view taken along line IIIB-IIIB in FIG. 3A.
Figure 3C:
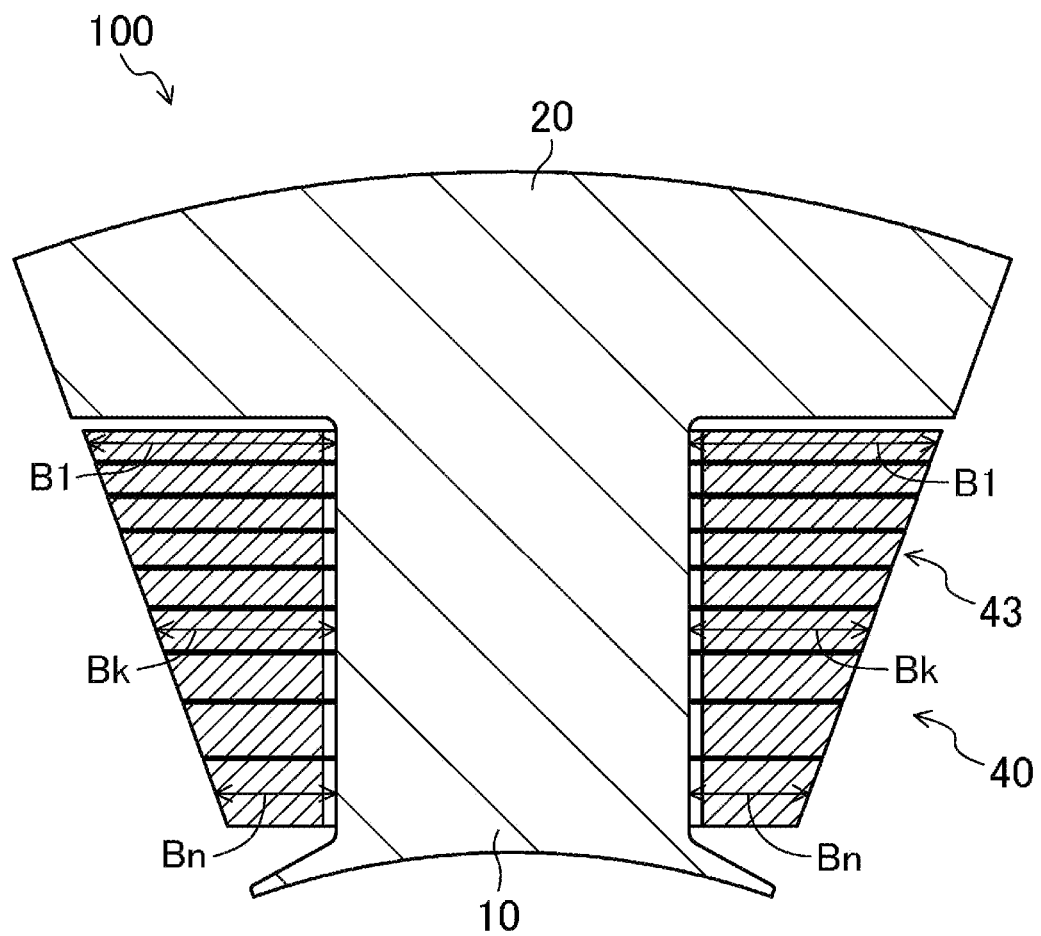
FIG. 3C is a cross-sectional view taken along line IIIC-IIIC in FIG. 3A.
Figure 3C:
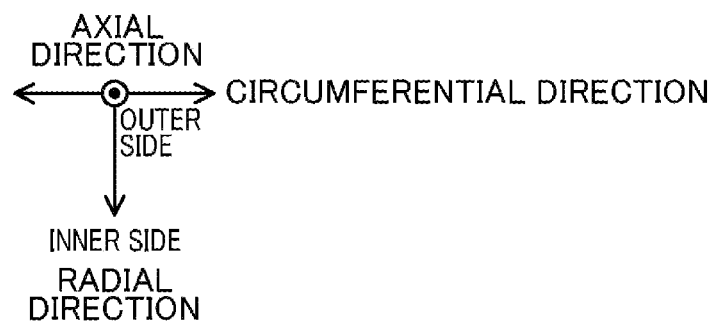

FIG. 2 is a schematic view of a k-th turn of a coil of this embodiment as viewed in the radial direction. FIG. 3A is a perspective view of a coil wound around a tooth. FIG. 3B is a cross-sectional view taken along line IIIB-IIIB in FIG. 3A. FIG. 3C is a cross-sectional view taken along line IIIC-IIIC in FIG. 3A.

As illustrated in FIGS. 3A to 3C, the coil 40 is a component including an n-turn winding (n is an integer equal to or greater than 2) of plate-shaped conductive wire. The coil 40 includes a first terminal 41, a second terminal 42, and a wound part 43. An insulating film (not shown) is provided on a surface of the coil 40. Portions of the wound part 43 that extend along axial end surfaces of the tooth 10 correspond to coil ends 44.

In the coil 40 mounted on the tooth 10, the first terminal 41 is located on a base end side of the tooth 10, and the second terminal 42 is located on a distal end side of the tooth 10. That is, the second terminal 42 is closer to the distal end of the tooth 10 than the first terminal 41. The wound part 43 is connected to the first terminal 41 at a first connection portion 41a and is connected to the second terminal 42 at a second connection portion 42a. That is, the wound part 43 is electrically connected to the first terminal 41 and the second terminal 42. The wound part 43 is wound around the tooth 10 by n turns from the first connection portion 41a to the second connection portion 42a.

Each of the first terminal 41 and the second terminal 42 is connected to a terminal of another coil 40 through a line, not shown, such as an external power supply line, a neutral line, a bridge line, or a bus bar. In a case where the coil 40 is a winding of a single piece of conductive wire, the first and second terminals 41 and 42 are respectively extensions of the two ends of the wound part 43. Alternatively, the first and second terminals 41 and 42 may be respectively attached to the two ends of the wound part 43, i.e., to the first connection portion 41a and the second connection portion 42a in this case, by welding or the like.

As illustrated in FIGS. 2 and 3A to 3C, the k-th turn (k is an integer that satisfies $1 \leq k \leq n$) of the coil 40 includes first sections k1 and second sections k2 located adjacent to the first sections k1 in a direction from the first terminal 41 toward the second terminal 42. The first sections k1 are disposed along the axial end surfaces of the tooth 10. The second sections k2 extend from ends of the first sections k1 and are disposed along circumferential end surfaces of the tooth. The first sections k1 correspond to portions of the coil ends 44. The first sections k1 are located in regions that face the tooth 10 in the axial direction, and the second sections k2 are located at least in regions that face the tooth 10 in a direction orthogonal to the axial direction.

The coil 40 has a configuration in which a relationship represented by $Ak < Bk$ is satisfied, where $Ak$ is a height of the first sections k1 in the axial direction of the tooth 10, and $Bk$ is a width of the second sections k2 in the circumferential direction of the tooth 10. Furthermore, as illustrated in FIG. 3B, the coil 40 has a configuration in which heights $A1$ to $An$ in the first to n-th turns are the same value, which in this case is A. By contrast, widths $B1$ to $Bn$ in the first to n-th turns of the coil 40 decrease toward the radially inner side, i.e., toward the distal end side of the tooth 10 as illustrated in FIG. 3C.

The actual coil 40 is mounted on the tooth 10 with the insulator, not shown, therebetween. Accordingly, each of the heights $A1$ to $An$ (=A) is a distance from a surface of the insulator to an axial end surface of the first section k1, and each of the widths $B1$ to $Bn$ is a distance from a surface of the insulator to a circumferential outer side surface of the second section k2.

Advantages

The stator 100 of this embodiment at least includes the annular yoke 20, the teeth 10 connected to the yoke 20, and the coils 40 including plate-shaped conductive wire and mounted on the teeth 10. Each coil 40 includes the first terminal 41, the wound part 43 electrically connected to the first terminal 41, and the second terminal 42 located closer to the distal end of the corresponding tooth 10 than the first terminal 41 and electrically connected to the wound part 43. The wound part 43 is wound around the tooth by n turns (n is an integer equal to or greater than 2).

The wound part 43 satisfies the relationship represented by $Ak<Bk$, where $Ak$ is the height of the first sections $k1$ in the axial direction, and $Bk$ is the width of the second sections $k2$ in the circumferential direction. The first and second sections $k1$ and $k2$ are sections in the k-th turn (k is an integer that satisfies $1 \leq k \leq n$) of the coil 40. The first sections $k1$ are along the axial end surfaces of the tooth 10. The second sections $k2$ are located adjacent to the first sections $k1$ in the direction from the first terminal 41 toward the second terminal 42 and extend from the ends of the first sections $k1$ along the circumferential end surfaces of the tooth 10.

Such a configuration of the coil 40 makes it possible to reduce the height $Ak$ of the first sections $k1$, which correspond to the coil ends 44, and reduce the size of the stator 100. The first sections $k1$ are located in the regions that face the tooth 10 in the axial direction, and the second sections $k2$ are located at least in the regions that face the tooth 10 in the direction orthogonal to the axial direction.

Furthermore, the configuration in which the widths $B1$ to $Bn$ in the first to n-th turns decrease toward the distal end side of the tooth 10 makes it possible to increase the space factor of the coil 40 housed in the slot 30.

Furthermore, this embodiment achieves downsizing of the coil 40 without significantly reducing the heat dissipation performance of the coil 40. This will be described below in detail. Heat generated in the coil 40 housed in the slot 30 mainly propagates to the tooth 10, and propagates also to the yoke 20 through the tooth 10. The heat is then dissipated through a component such as a housing, not shown, of the motor into the surrounding atmosphere or to a separately provided heat dissipation member.

On the other hand, the heat in the coil ends 44, which are portions protruding out of the slot 30, does not easily propagate to the tooth 10 or the yoke 20 and is directly dissipated into the surrounding atmosphere. However, the surrounding atmosphere has a smaller heat conductivity than, for example, the electromagnetic steel sheets forming the tooth 10 and the yoke 20, and the insulator, not shown, made of resin and attached to the tooth 10. Consequently, the heat is likely to build up in the coil ends 44.

However, according to this embodiment, the height $Ak$ of the first sections $k1$ is smaller than the width $Bk$ of the second sections, and thus the coil ends 44 have a reduced volume. It is therefore possible to restrict the amount of heat that builds up in the coil ends 44 to a low level. Furthermore, by decreasing the distance between the upper surface of the first sections $k1$ and the tooth 10, the amount of heat that propagates from the coil end 44 to the tooth 10 and the yoke 20 can be increased.

Portions housed in the slot 30 and contributing to the heat dissipation, which in other words are the second sections $k2$, have the width $Bk$ in the circumferential direction that is large enough for the coil 40 to have a predetermined space factor or greater. This configuration can therefore achieve the heat dissipation performance of the coil 40 that is comparable with the conventional configuration disclosed in Patent Document 1, for example.

The motor 1000 of this embodiment at least includes the stator 100 and the rotor 200 provided at a predetermined distance from the stator 100.

This embodiment makes it possible to reduce the height of the coils 40 and the height of the resulting stator 100, allowing for downsizing of the motor 1000. This embodiment also achieves heat dissipation performance of the motor 1000 that is comparable with that of the conventional configuration.

Second Embodiment

Figure 4A:
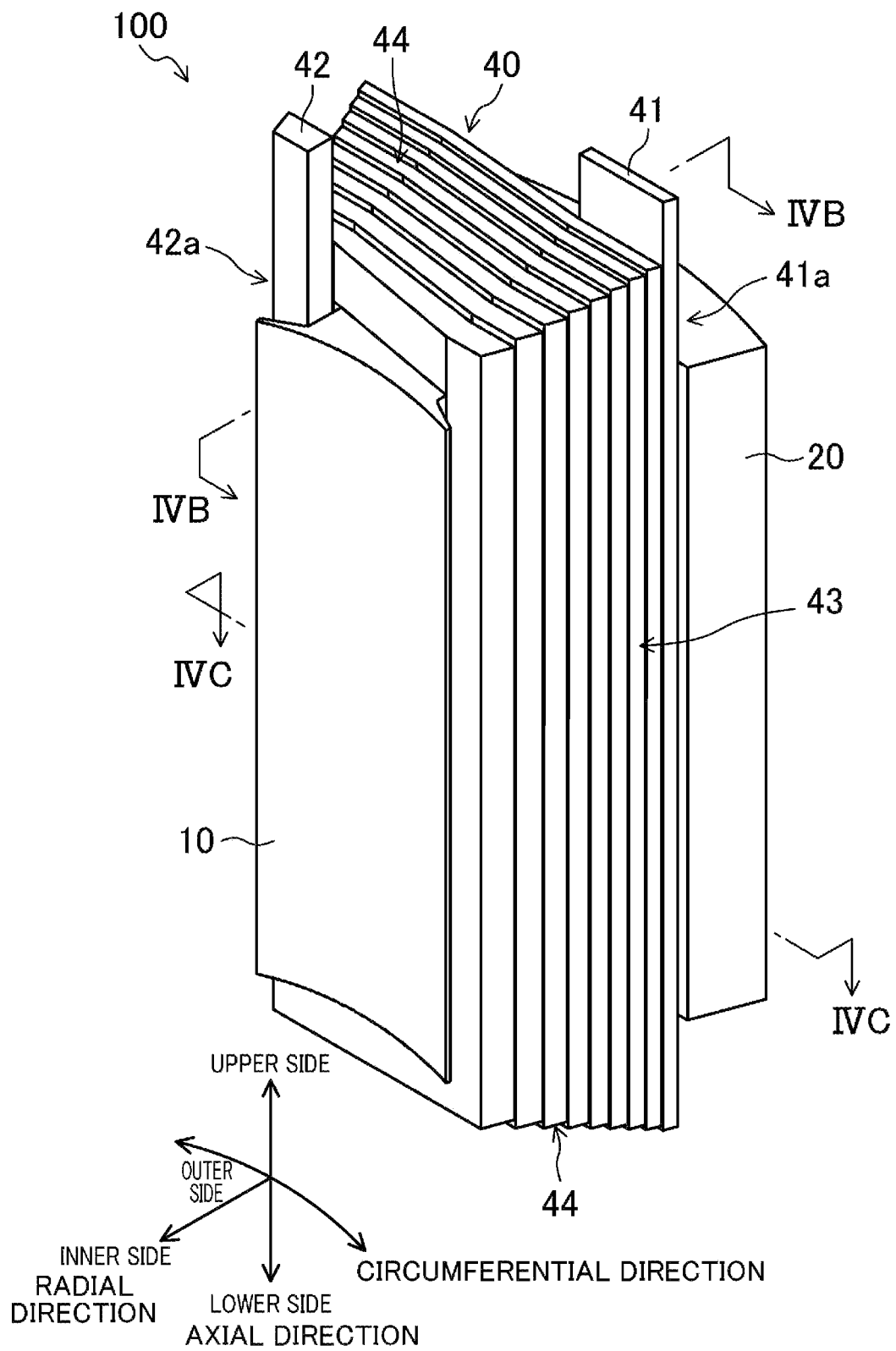
FIG. 4A is a perspective view of a coil wound around a tooth of a second embodiment of the present invention.
Figure 4B:
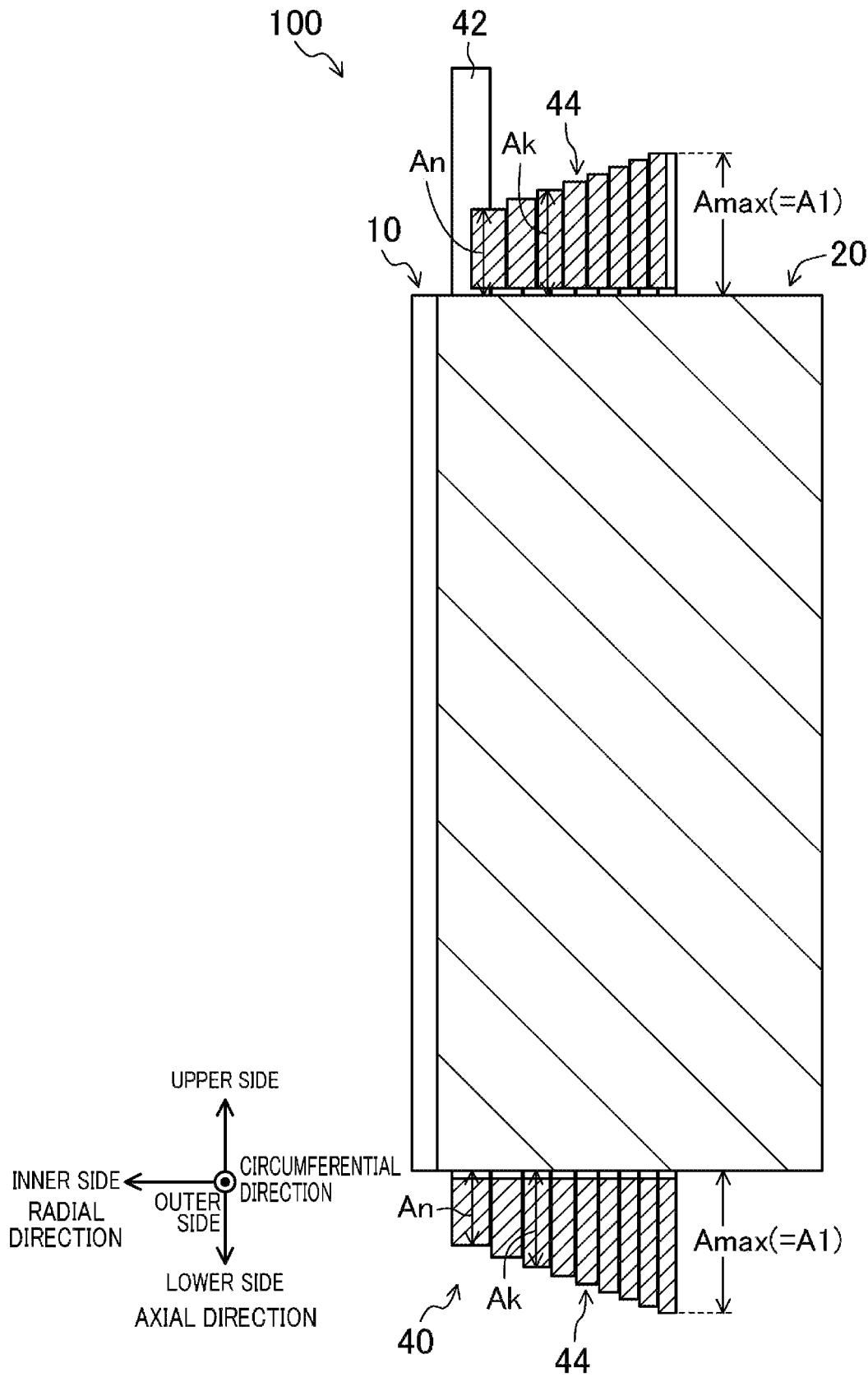
FIG. 4B is a cross-sectional view taken along line IVB-IVB in FIG. 4A.
Figure 4C:
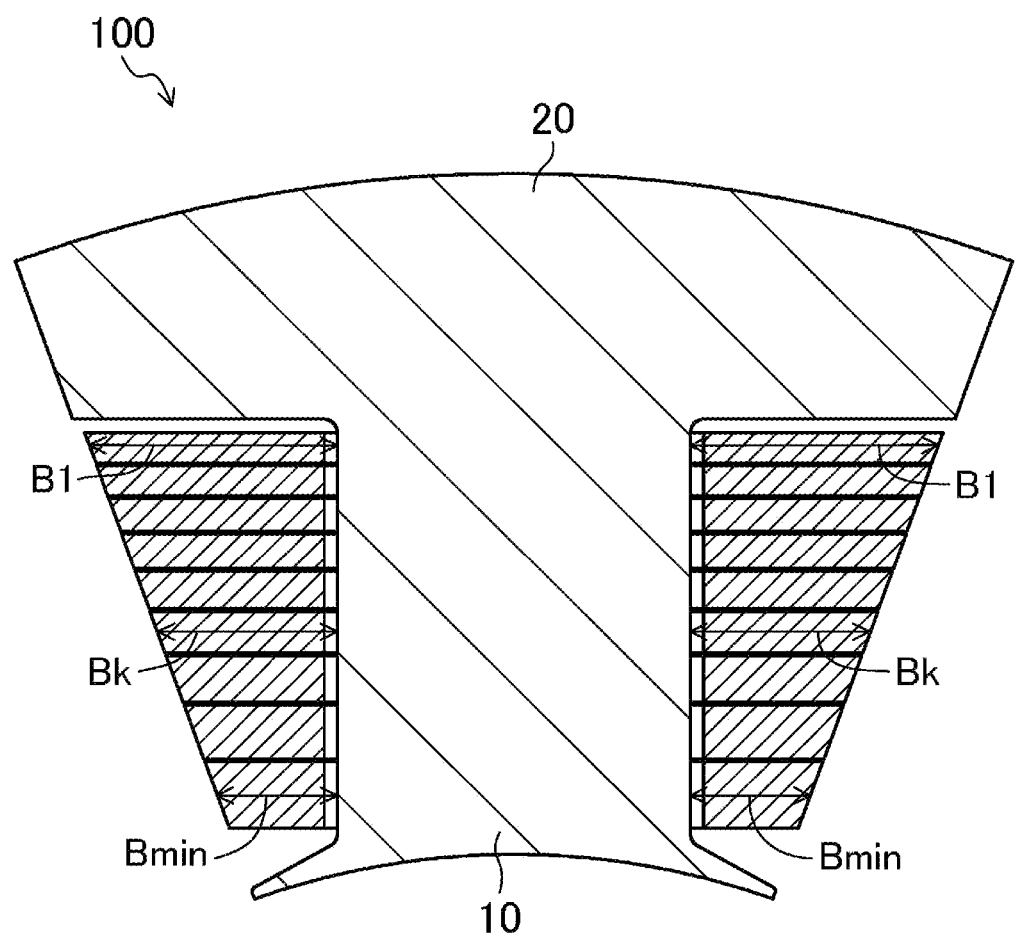
FIG. 4C is a cross-sectional view taken along line IVC-IVC in FIG. 4A.
Figure 4C:
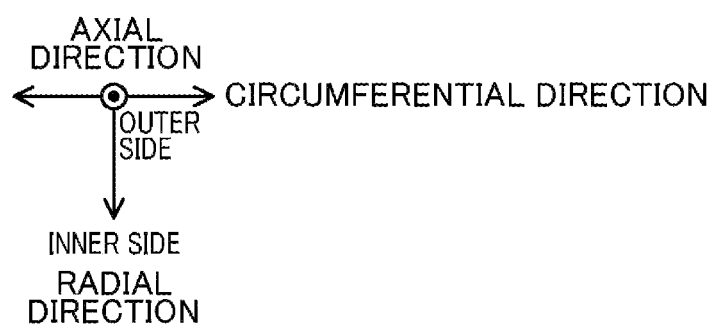

FIG. 4A is a perspective view of a coil wound around a tooth of this embodiment. FIG. 4B is a cross-sectional view taken along line IVB-IVB in FIG. 4A. FIG. 4C is a cross-sectional view taken along line IVC-IVC in FIG. 4A. In FIGS. 4A to 4C, the same features as those in the first embodiment are denoted by the same reference characters, and detailed description thereof is omitted.

The configuration of this embodiment differs from the configuration of the first embodiment in the following points. First, the coil 40 has a configuration in which the heights $A1$ to $An$ of the first sections decrease from the first turn toward the n-th turn.

Such a configuration of the coil 40 makes it possible to reduce the rate of change of the cross-sectional area, which in other words is the rate of change of the current density, in the turns. This reduces variations in heat generation between different turns, increasing the reliability of the coil 40 and the efficiency of the motor 1000.

In a case where this configuration has a constant ratio between the height $Ak$ and the width $Bk$ in the first to n-th turns, in particular, the rate of change of the cross-sectional area, which in other words is the rate of change of the current density, in the turns can be maintained constant. This reduces variations in heat generation within the coil 40, further increasing the reliability of the coil 40 and the efficiency of the motor 1000.

Another difference is that the coil 40 has a configuration that satisfies a relationship represented by $Amax<Bmin$, where $Amax$ is the largest value among the heights $A1$ to $An$ in the first to n-th turns, and $Bmin$ is the smallest value among the widths $B1$ to $Bn$ in the first to n-th turns.

Such a configuration of the coil 40 makes it possible to sufficiently reduce the height of the coil ends 44 while ensuring a sufficient current density of the current flowing through the coil 40.

Note that the coil 40 does not have to satisfy the configuration in which the heights $A1$ to $An$ of the first sections decrease from the first turn toward the n-th turn and the configuration in which the relationship represented by $Amax<Bmin$ is satisfied at the same time. By satisfying either one of the configurations, the effects corresponding to the satisfied configuration can be achieved.

Variation

FIG. 5 shows schematic views of cross sections of coil ends of this variation. Note that the schematic views in FIG. 5 each correspond to the cross section of the first sections $k1$ on an upper side of the cross section illustrated in FIG. 3B or 4B in the axial direction. In FIG. 5, the same features as those in the first and second embodiments are denoted by the same reference characters, and detailed description thereof is omitted.

The configuration of the present variation differs from the configuration of the first embodiment in that the height of the coil ends 44 changes in the first to n-th turns. The heights A1 to An may change as illustrated in an illustration (a) of FIG. 5 or as illustrated in an illustration (b) of FIG. 5, for example, rather than regular changes such as shown in the second embodiment. Alternatively, the heights A1 to An may change as illustrated in an illustration (c) of FIG. 5. Furthermore, the coil end 44 on a lower side in the axial direction, not shown in FIG. 5, may have any of the shapes illustrated in FIG. 5. The heights A1 to An may change in the first to n-th turns in any manner other than those illustrated in FIG. 5. The height of the coil end 44 may change in a manner such that the height Ah (h is an integer that satisfies 2≤h≤n−1) is higher than any one of the heights A1 to Ah−1 of the first sections in the axial direction in the first to (h−1)th turns and is also higher than any one of the heights Ah+1 to An of the first sections in the axial direction in the (h+1)th to n-th turns. Alternatively, the height of the coil end 44 may change in a manner such that the height Ah is lower than any one of the heights A1 to Ah−1 and is also lower than any one of the heights Ah+1 to An.

As described above, the heat in the coil ends 44 is mainly dissipated into the surrounding atmosphere. According to the present variation, the height of the coil end 44 changes as described above, and thus the coil end 44 can have a larger surface area than in the first and second embodiments, for example, increasing the rate of heat dissipation from the coil end 44 into the surrounding atmosphere.

Furthermore, according to the present variation, at least one of the axial end surfaces of the coil ends 44, i.e., the upper surface or the lower surface has a recess, a projection, or both. Thus, the recess or either side of the projection can be used as a flow path for refrigerant to flow into the stator 100. This makes it possible to improve the efficiency of cooling of the stator 100 including the coil 40 and the efficiency of the motor 1000. Note that a liquid such as oil or water may be used as the refrigerant.

Preferably, the smallest value Amin among the heights A1 to An of the first sections in the axial direction in the first to n-th turns is equal to or greater than a predetermined value in order to prevent or reduce breaking of the coil 40 due to Joule heating and reliability degradation.

Other Embodiments

An example has been described in the first embodiment where the teeth 10 are connected to the annular yoke 20. The configuration is not particularly limited thereto. Each of the teeth 10 may be connected to one of divided yokes divided in the circumferential direction. In this state, the divided yokes may be connected together in the circumferential direction into the stator 100.

The cross-sectional shape of the conductive wire forming the coil 40 may be a trapezoid, a rectangle, a square, or an n-gon (n is an integer equal to or greater than 4).

In FIGS. 3A to 3C and 4A to 4C, the coil 40 is mounted on the tooth 10 such that the first terminal 41 is on the base end side of the tooth 10 and the second terminal 42 is on the distal end side of the tooth 10. However, the positions of the first terminal 41 and the second terminal 42 are not particularly limited thereto. For example, both the first terminal 41 and the second terminal 42 may be on the base end side of the tooth 10 as a result of the second terminal 42 being drawn toward the radially outer side. Even in this case, the second connection portion 42a is located on the distal end side of the tooth 10.

An example has been described in the first and second embodiments where the height of the first section k1 and the width of the second sections k2 in the k-th turn in each of the coil ends 44 on the upper and lower sides in the axial direction satisfy the relationship represented by Ak<Bk. However, this relationship does not have to be satisfied in the coil ends 44 on both the sides in the axial direction as long as the relationship represented by Ak<Bk is satisfied in at least one of the coil ends 44.

INDUSTRIAL APPLICABILITY

Since the coil ends can have a reduced height, the stator of the present invention is usefully applied to a motor for which downsizing is desired.

DESCRIPTION OF REFERENCE CHARACTERS

10 Teeth
20 Yoke
30 Slot
40 Coil
41 First Terminal
42 Second Terminal
43 Wound Part
44 Coil End
100 Stator
200 Rotor
210 Output Shaft
220 Magnet
1000 Motor
k1 First Section in k-th Turn of Coil 40
k2 Second Section in k-th Turn of Coil 40
Ak Height of First Section k1 in Axial Direction
Bk Width of Second Section k2 in Circumferential Direction

The invention claimed is:

1. A motor comprising:
a stator;
a rotor; and
an output shaft disposed at an axial center of the rotor,
the stator including: an annular yoke;
teeth connected to the yoke; and
coils including plate-shaped conductive wire and mounted on the respective teeth, the stator being disposed on a radially outer side of the rotor at a predetermined distance from the rotor,
each of the coils including:
a first terminal;
a wound part electrically connected to the first terminal; and
a second terminal located closer to a distal end of a corresponding tooth than the first terminal and electrically connected to the wound part,
the wound part being wound around the corresponding tooth by n turns, n being an integer equal to or greater than 2,
assuming that:
an outer circumferential direction of the motor is a circumferential direction;
a radial direction of the motor is a radial direction; and
a direction in which the output shaft extends is an axial direction,
the wound part satisfying a relationship represented by Ak<Bk, Ak being a height of a first section in the axial direction, Bk being a width of a second section in the circumferential direction, the first and second sections being sections in a k-th turn of the coil, k being an integer that satisfies 1<k<n, the first section being along an axial end surface of the tooth, the second section being located adjacent to the first section in a direction from the first terminal toward the second terminal and extending from an end of the first section along a circumferential end surface of the tooth, heights of the first sections in the axial direction decreasing from a first turn toward an n-th turn, thicknesses of the first sections in the radial direction increasing from the first turn toward the n-th turn, the first turn being a radially outermost turn in the coil and the n-th turn being a radially innermost turn in the coil, and a ratio between Ak and Bk is constant in the first to n-th turns.

2. The motor of claim 1, wherein a relationship represented by Amax<Bmin is satisfied, where Amax is a largest value among the heights of the first sections in the axial direction in the first to n-th turns, and Bmin is a smallest value among the widths of the second sections in the circumferential direction in the first to n-th turns.

3. The motor of claim 1, wherein the first section is located in a region that faces the tooth in the axial direction, and the second section is located at least in a region that faces the tooth in a direction orthogonal to the axial direction.

4. The motor of claim 1, wherein the widths of the second sections in the circumferential direction decrease from the first turn toward the n-th turn.

* * * * *